Oct. 25, 1960 L. BABACZ 2,957,353
CONNECTOR
Filed Aug. 26, 1958
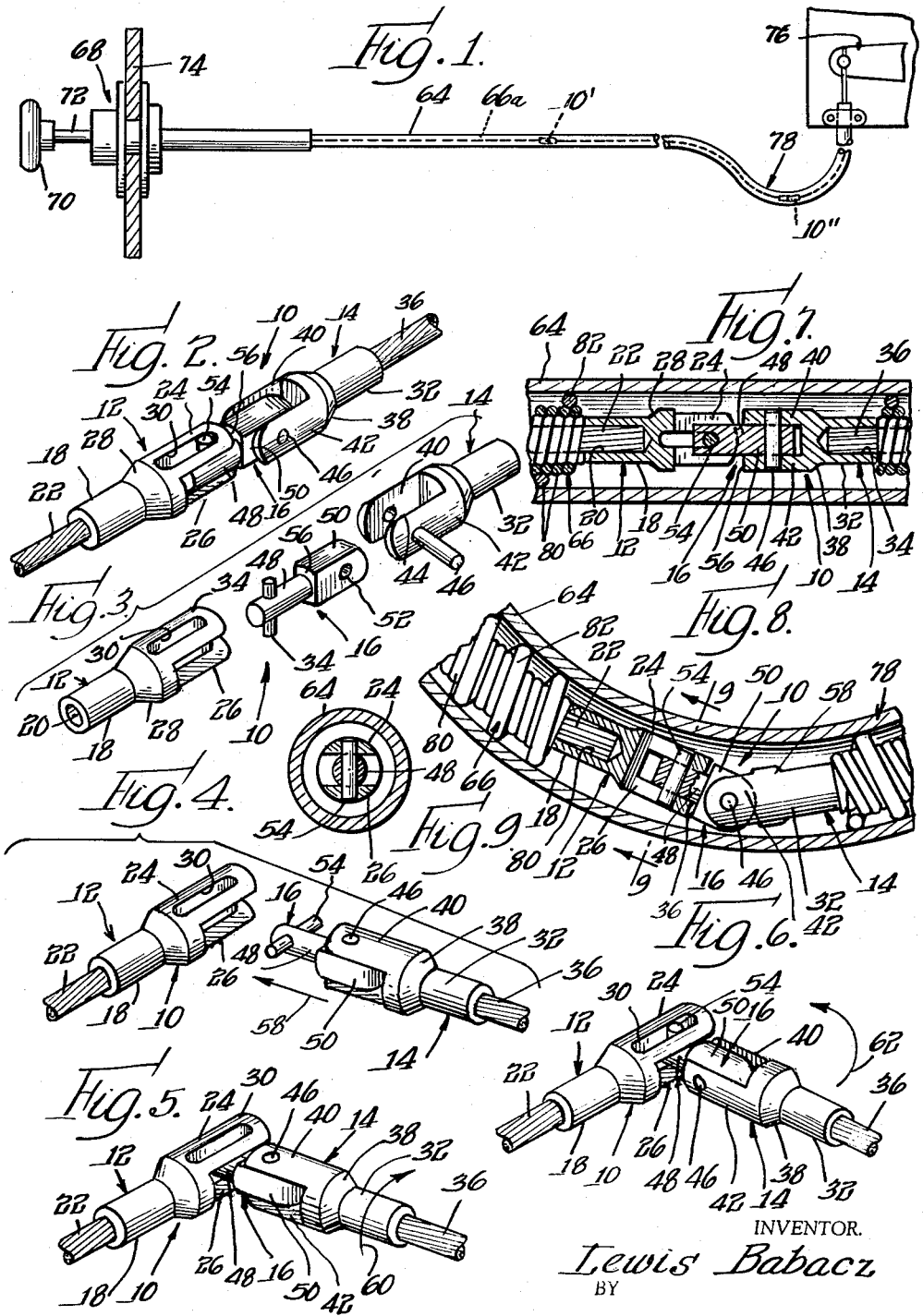
INVENTOR.
Lewis Babacz
BY
Olson & Trexler
Attys United States Patent Office 2,957,353
Patented Oct. 25, 1960

2,957,353

CONNECTOR

Lewis Babacz, Philadelphia, Pa., assignor to Teleflex Incorporated, North Wales, Pa., a corporation of Delaware Filed Aug. 26, 1958, Ser. No. 757,276

4 Claims. (Cl. 74—501)

This invention relates to connectors and more particularly to connectors for connecting rigid or flexible members such as shafts, or rods, or cables.

Many connectors of the quick disconnect type have been suggested heretofore for use in transmission devices for transmitting torsional, compressional and tensional forces. However, these prior art connectors have been subject to many disadvantages. Some connectors are capable of transmitting torsional or compressional and tensional forces, but not both. Further, certain connectors which have been suggested for accomplishing both functions have had unduly complicated structures which require the use of tools for assembly and disassembly.

Also positive interlocking of the members of certain heretofore proposed connectors has not been achieved for preventing the accidental separation of the members during use. The instant invention has all of the desirable attributes of a universal type connector and overcomes the aforementioned disadvantages in one simple structure.

An object of this invention is the provision of a connector which may be easily assembled and disassembled by anyone without the use of any tools whatsoever.

A further object of the invention is the provision of a connector which enables the members thereof to be uncoupled only when moved to an abnormal position.

A further object of the invention is the provision of a connector which may be used for transmitting torsional, compressional, tensional forces.

Other objects and advantages of the present invention will become apparent from the following description and the accompanying drawings, wherein:

Fig. 1 is a somewhat schematic view illustrating the use of a connector in a simple push-pull flexible cable control system;

Fig. 2 is a perspective view showing the assembled connector in association with a flexible cable;

Fig. 3 is an exploded perspective view showing the elements of the connector;

Figs. 4–6 are perspective views illustrating the steps of assembling the connector shown in Figs. 2 and 3, wherein Fig. 4 shows the position of the connector members in the first step, Fig. 5 shows the position of the connector members in the second step, and Fig. 6 shows the position of the elements in the third step;

Fig. 7 is a sectional view showing the assembled connector in association with a flexible cable and disposed in a straight portion of a guide conduit;

Fig. 8 is an elevational view, partly in section, showing the connector and associated cable in a curved portion of a guide conduit; and Fig. 9 is a cross sectional view taken along line 9—9 of Fig. 8.

Referring now more specifically to the drawings, and first to Figs. 2 and 3, there will be seen a connector designated generally by the numeral 10 incorporating the principles of this invention. The connector 10 comprises a pair of bifurcated end members 12 and 14, and coupling member 16.

Bifurcated end member 12 has a cylindrical shank portion 18 with a bore 20 in one end thereof to receive the end of flexible cable 22 which is secured therein by conventional means such as, welding, crimping or soldering. At the opposite end of shank portion 18 is a pair of arms 24 and 26 having a cylindrical configuration and being elongated longitudinally. Arms 24 and 26 are connected to shank portion 18 by an intermediate portion 28 which extends outwardly therefrom towards the arms 24, 26 to provide a cylindrical bifurcation having a diameter greater than shank portion 18. The arms 24 and 26 of the bifurcation being longer than the spacing between the arms are provided with axially elongated slots 30 which terminate short of the outer ends of arms 24 and 26.

End member 14 comprises a bifurcated member having a shank portion 32 containing a bore 34 for receiving the end of a cable 36 secured therein by conventional means. The bifurcated end is connected to the opposite end of shank portion 32 by an intermediate portion 38 flaring outwardly to yield a cylindrical form bifurcation having arms 40 and 42. Arms 40 and 42 are provided with transverse apertures 44 for receiving pivot pin 46.

Coupling member 16 comprises a longitudinally elongated member having a cylindrical end portion 48 and an angular cross sectional end portion 50. Angular portion 50 is provided with an aperture 52 for receiving pivot pin 46 when members 14 and 50 are assembled. Cylindrical portion 48 is provided with pivot pin 54 for engagement with the bifurcation arms 24 and 26 of end member 12. Pivot pin 54 and aperture 52 are spaced apart longitudinally of the coupling member and have their axes disposed at right angles to each other.

It will be noted that slots 30 in arms 24 and 26 of end member 12 are elongated for a distance corresponding substantially to the length of pin 54. The arms 24 and 26 are spaced apart for a distance corresponding substantially to the diameter of the cylindrical portion 48 of coupling member 16 as shown in Fig. 9. The shoulder 56 formed at the junction of the cylindrical portion 48 and angular portion 50 of coupling member 16 acts as a stop to limit the axial movement of coupling member 16 with respect to end member 12. The spacing of pin 54 from shoulder 56 is at least as great as the spacing from the longitudinal edges and the outer ends of slot 30 to the adjacent corresponding edge of the arms 24 and 26. This spacing permits pivotal movement of member 16 around pivot pin 54 when pivotally connected to end member 12. The outer ends of the arms 24 and 26, 40 and 42 terminate in arcs transverse to the axes thereof and are convex toward the other member thereby providing for free pivotal movement when the parts are assembled.

The assembly of the connector 10 is effected in the following manner. The end portion 50 of coupling member 16 is inserted between the arms 40 and 42 of bifurcated end member 14 with apertures 44 and 52 in alignment. Pin 46 is then inserted in apertures 44 and through aperture 52 to pivotally connect end member 14 and coupling member 16. End member 14 with coupling member 16 pivotally connected thereto is rotated to place pin 54 in a position parallel with the arms 24 and 26 of end member 12 as shown in Fig. 4. The members 12 and 14 are then brought into mating relationship in the direction shown by arrow 58. When the slots 30 and pin 54 are in alignment as shown in Fig. 5, the end member 14 with coupling member 16 is rotated 90° in the direction of the arrow 60 to the position shown in Fig. 6. Members 12 and 14 are then pivoted 90° around pivot pin 54 in the direction of the arrow 62 shown in Fig. 6 to the pivotally connected position shown in Fig. 2.

It will be apparent from the disclosure hereinbefore made that the instant invention provides a connector which has a minimum number of parts, which is simple to manufacture, and which may be easily assembled or disassembled without the necessity of tools.

It will also be apparent that when the elements of the connector of the instant invention are assembled that the elements are positively interlocked and cannot be inadvertently separated.

To disconnect the assembled connector, the members 12 and 14 must be first rotated 90° towards each other around pivot pin 54, and then rotated another 90° around cylindrical portion 48 of coupling 16 before the coupling member 16 can be separated from end member 12.

The instant invention further provides a simple connector which permits the transmission of torsional, compressional and/or tensional forces whenever such transmission is desired.

The use of the improved connector of the instant invention may be described in connection with a simple push-pull control device wherein it is desired to control a device remotely located from the point of control. Such a control system is schematically illustrated in Fig. 1. In such a system the control system comprises a conduit 64 having a flexible cable indicated generally by the numeral 66 therein as shown in Figs. 7 and 8 and indicated by dotted line 66a in Fig. 1. The cable 66 is connected to a controller, generally indicated by 68, comprising a knob 70 connected to a special slider 72 which in turn is connected to the cable 66. Controller 68 is mounted in a panel 74. At the other end of cable 66 and attached thereto is the controlled device indicated generally by the numeral 76. Sometimes it is necessary to place bends in the conduit 64 as indicated at 78 between controller 68 and the controlled device 76. Sometimes it is necessary to connect portions of cable 66 in horizontal runs of the conduit 64 and such a connection is indicated by 10' in Fig. 1. A similar connection 10" (Fig. 1) is shown located in the bend 78 of conduit 64.

Fig. 7 illustrates the use of the connector of the present invention in combination with a flexible cable 66 and positioned in a straight run of conduit 64. Cable 66 comprises a core of high tensile strength multistrand cable 22 having a series of helically-wound layers of wire 80 thereon. The outermost wire 82 of these windings fits snugly within the bendable rigid tubular conduit 64 so that smooth push-pull motion is transmitted by the cable with practically no distortion of the cable. It will be seen in Fig. 7 that connector 10 associated with the cable 66 provides a positive connection of the ends 22 and 36 of the cable and that connector 10 in conduit 64 does not touch the inner walls of conduit 64 and thereby avoids frictional contact therewith.

Fig. 8 illustrates the connector 10 in the arcuate portion 78 of conduit 64. The position of connector 10 in this figure illustrates that compressional and tensional forces may be transmitted by cable 66 throught the pivotal connection of the end member 14 and coupling member 16 by pivot pin 46. The diameter of connector 10 being less than the diameter of the outer windings 82 of cable 66 permits free travel of the connector without frictionally engaging the inner walls of conduit 64 in the arcuate portion 78 thereof.

While the preferred embodiment of the present invention has been shown and described herein it is obvious that many structural details may be changed without departing from the spirit and scope of the appended claims.

The invention is claimed as follows:

1. A connector comprising a pair of bifurcated end members and an elongated coupling member pivotally connected to said end members, said coupling member being provided with pivot means spaced apart longitudinally of said coupling member and having their axes disposed at right angles to each other, one of said pivot means comprising pin means projecting radially from a first end portion of said coupling member, said first end portion having predetermined transverse dimensions in a direction extending substantially perpendicularly to the axes of said pin means and of said coupling member, one of said bifurcated end members including axially elongated arms spaced apart a distance greater than said predetermined transverse dimensions of said coupling member first end portion, said arms having axially elongated slots therein terminating short of ends thereof, said slots receiving said pin means, and enlargement means on said coupling member engageable with an end of said one end member to limit axial movement of said coupling member relative to said one end member, said slots being elongated for a distance at least as great as the length of said pin means for permitting rotative passage of the pin means in the slots when said coupling member first end portion is disposed between and rotated relative to said arms for assembling or disassembling said coupling member and said one end member when the same are at an abnormal angle relative to each other, the spacing of the pin means from the enlargement means on the coupling member being at least as great as spacing from the longitudinal edges and outer ends of the slots from adjacent corresponding edges of the arms.

2. A transmission system comprising tubular guide conduit means having a predetermined internal diameter, a pair of motion transmitting cables disposed in said conduit means, each of said cables comprising a central tension accommodating core element having a diameter substantially less than said internal diameter of the conduit means and helically wound wire means around said core element having a diameter similar to but less than said internal diameter of said conduit means, axially short end portions of the core elements at adjacent ends of said cables extending beyond said helically wound wire means of their respective cables, and a connector extending between said adjacent ends of said cables and having transverse dimensions throughout its length substantially less than said internal diameter of said conduit means, said connector comprising a pair of opposite end members each having a socket portion receiving and secured to the axially projecting end portion of the core element of the adjacent cable, said socket portions having external diameters less than said diameter of said helically wound wire means, each of said end members including a bifurcated portion extending from its socket portion and presenting a pair of axially elongated spaced apart arms, and a coupling member extending between said pairs of arms and pivotally connected to one of said pairs of arms for movement about a first axis and detachably pivotally connected to the other of said pairs of arms for movement about a second axis disposed at right angles with respect to said first axis.

3. A transmission system, as defined in claim 2, wherein said last mentioned pair of arms includes elongated slot means therein terminating short of outer ends thereof, said coupling member comprising transverse pin means extending radially from an end portion thereof into said slots, said end portion of said coupling member having transverse dimensions less than the spacing of said last mentioned pair of arms for enabling said coupling member end portion to be pivoted relative to said last mentioned pair of arms, said slots being elongated for distance at least as great as the length of said pin means.

4. A force transmitting coupling comprising: a first member including a pair of longitudinally extending arms spaced-apart a predetermined distance; a coupling member pivotal relative to said first member, said coupling member including a first end portion having transverse dimensions less than said predetermined distance and pin means projecting radially from said first end portion, said arms having axially elongated slots therein terminating short of the ends thereof, said slots pivotally receiving said pin means; means coacting between said members for limiting axial movement of said members relatively toward each other when said members are generally axially aligned with each other within predetermined limits, said slots being elongated for a distance at least substantially as great as the length of said pin means for permitting rotative passage of the pin means through the slots when said first end portion of the coupling member is disposed between and rotated relative to said arms for assembling and disassembling the members when said members are at an abnormal angle relative to each other; a second member including a pair of longitudinally extending spaced-apart arms, said second mentioned arms embracing a second end portion of said coupling member oppositely disposed from said first end portion; and means pivotally connecting said second mentioned arms and said second coupling member end portion for relative movement about an axis extending transversely with respect to said pin means.

References Cited in the file of this patent

UNITED STATES PATENTS

| | | |
|---|---|---|
| 595,708 | Forsyth | Dec. 21, 1897 |
| 653,397 | Pettijohn | July 10, 1900 |
| 1,259,642 | Long | Mar. 19, 1918 |
| 1,416,119 | Nichols | May 16, 1922 |
| 1,983,962 | Barber et al. | Dec. 11, 1934 |
| 2,051,700 | Grace | Aug. 18, 1936 |
| 2,304,766 | Pratt | Dec. 8, 1942 |
| 2,401,130 | Ayers | May 28, 1946 |
| 2,416,206 | Norton | Feb. 18, 1947 |